United States Patent
Zhang

(10) Patent No.: US 12,361,832 B2
(45) Date of Patent: *Jul. 15, 2025

(54) METHOD AND APPARATUS FOR CONTROLLING VEHICLE TO DRIVE AS PLATOON, ELECTRONIC DEVICE, AND STORAGE MEDIUM

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 292 days.

This patent is subject to a terminal disclaimer.

(21) Appl. No.: 17/982,424

(22) Filed: Nov. 7, 2022

(65) Prior Publication Data

US 2023/0063010 A1 Mar. 2, 2023

Related U.S. Application Data

(63) Continuation of application No. PCT/CN2021/129424, filed on Nov. 9, 2021.

(30) Foreign Application Priority Data

Dec. 15, 2020 (CN) .......................... 202011478798.2

(51) Int. Cl.
*G08G 1/00* (2006.01)
*B60W 30/165* (2020.01)
(Continued)

(52) U.S. Cl.
CPC ............... *G08G 1/22* (2013.01); *G05D 1/695* (2024.01); *G05D 1/6985* (2024.01); *H04W 4/08* (2013.01);
(Continued)

(58) Field of Classification Search
CPC ........ G08G 1/22; G05D 1/695; G05D 1/6985; H04W 4/08; H04W 4/46; H04W 4/40; B60W 30/165; B60W 2050/046
See application file for complete search history.

(56) References Cited

U.S. PATENT DOCUMENTS 9,799,224 B2 * 10/2017 Okamoto ................. G08G 1/22
12,198,555 B2 * 1/2025 Zhang ....................... G08G 1/22
(Continued)

FOREIGN PATENT DOCUMENTS

| CN | 105809950 A | 7/2016 |
| CN | 107767658 A | 3/2018 |

(Continued)

OTHER PUBLICATIONS

Tencent Technology, WO, PCT/CN2021/129424, Jan. 13, 2022, 5 pgs.

(Continued)

*Primary Examiner* — Dale W Hilgendorf
(74) *Attorney, Agent, or Firm* — Morgan, Lewis & Bockius LLP

(57) ABSTRACT

This application provides a method for controlling vehicles to drive as a platoon performed by an electronic device. The method includes: transmitting, from a leading vehicle, a first platoon disbanding message to a target non-tail following vehicle and a second platoon disbanding message to the other remaining following vehicles, the second message including a temporary disbanding instruction for instructing to temporarily disband the current vehicle platoon, so that the target non-tail following vehicle adjusts a status thereof to a free status and drives away from the current vehicle platoon; transmitting, from the leading vehicle, a re-team up invitation message to each of the remaining following vehicles according to the second platoon disbanding message; receiving, at a leading vehicle, a re-team up confir- (Continued)

mation message; and reorganizing each of the remaining following vehicles according to the re-team up confirmation message to form a new vehicle platoon.

20 Claims, 9 Drawing Sheets

(51) Int. Cl.
  *B60W 50/04* (2006.01)
  *G05D 1/695* (2024.01)
  *G05D 1/698* (2024.01)
  *H04W 4/08* (2009.01)
  *H04W 4/46* (2018.01)

(52) U.S. Cl.
  CPC ............ *H04W 4/46* (2018.02); *B60W 30/165* (2013.01); *B60W 2050/046* (2013.01)

(56) References Cited

U.S. PATENT DOCUMENTS

| | | | | |
|---|---|---|---|---|
| 2014/0316671 | A1* | 10/2014 | Okamoto | G08G 1/22 701/96 |
| 2014/0316865 | A1* | 10/2014 | Okamoto | G08G 1/22 705/14.1 |
| 2017/0344023 | A1* | 11/2017 | Laubinger | B60W 30/165 |
| 2018/0188746 | A1* | 7/2018 | Lesher | G05D 1/0217 |
| 2019/0079538 | A1* | 3/2019 | Switkes | G08G 1/22 |
| 2019/0349719 | A1* | 11/2019 | Pattan | H04W 4/40 |
| 2020/0336375 | A1* | 10/2020 | Ucar | H04L 41/082 |
| 2020/0342766 | A1* | 10/2020 | Gundavelli | G08G 1/22 |
| 2023/0066197 | A1* | 3/2023 | Zhang | G08G 1/22 |

FOREIGN PATENT DOCUMENTS

| | | |
|---|---|---|
| CN | 107941233 A | 4/2018 |
| CN | 110070707 A | 7/2019 |
| CN | 110276945 A | 9/2019 |
| CN | 111445690 A | 7/2020 |
| CN | 112416010 A | 2/2021 |
| CN | 112596522 A | 4/2021 |
| DE | 102018211236 A1 | 1/2020 |
| JP | 2011258056 A | 12/2011 |

OTHER PUBLICATIONS

Tencent Technology, IPRP, PCT/CN2021/129424, Jun. 13, 2023, 6 pgs.
Tencent Technology, ISR, PCT/CN2021/129424, Jan. 13, 2022, 3 pgs.

* cited by examiner

METHOD AND APPARATUS FOR CONTROLLING VEHICLE TO DRIVE AS PLATOON, ELECTRONIC DEVICE, AND STORAGE MEDIUM

CROSS-REFERENCE TO RELATED APPLICATIONS

This application is a continuation application of PCT Patent Application No. PCT/CN2021/129424, entitled "VEHICLE PLATOON DRIVING CONTROL METHOD AND APPARATUS, ELECTRONIC DEVICE AND STORAGE MEDIUM" filed on Nov. 9, 2021, which claims priority to Chinese Patent Application No. 202011478798.2, filed with the State Intellectual Property Office of the People's Republic of China on Dec. 15, 2020, and entitled "METHOD FOR CONTROLLING VEHICLE TO DRIVE AS PLATOON AND RELATED DEVICE", all of which are incorporated herein by reference in their entirety.

This application relates to U.S. patent application Ser. No. 17/982,427, entitled "METHOD FOR CONTROLLING VEHICLES DRIVING AS PLATOON AND RELATED DEVICES" filed on Nov. 7, 2022, which is incorporated herein by reference in its entirety.

FIELD OF THE TECHNOLOGY

This application relates to the field of computer and communication technologies, and specifically, to a method and apparatus for controlling vehicles to drive as a platoon, an electronic device, and a computer-readable storage medium.

BACKGROUND OF THE DISCLOSURE

With the development and applications of new technologies such as automatic driving technologies, information communication technologies, and cloud computing, vehicles are accelerating to change from manually controlled mechanical products to intelligent products controlled by an intelligent system. Traffic accidents caused by fatigue driving of a vehicle driver are usually reported, and an accident rate can be effectively reduced by applying the automatic driving technologies to vehicles. In addition, the number of drivers required for automatic driving is greatly reduced, thereby saving labor costs.

Multi-vehicle platooning is a key direction. If platooning cooperation is implemented among vehicles, read-end collision accidents caused by emergency braking of a front vehicle can be effectively reduced, and a following distance between vehicles can be reduced through multi-vehicle platooning automatic driving, so that wind resistance on rear vehicles is smaller and oil consumption costs of the rear vehicles can be reduced.

SUMMARY

Embodiments of this application provide a method and apparatus for controlling vehicles to drive as a platoon, an electronic device, and a computer-readable storage medium, and provide a solution to a case that a non-tail vehicle inside a platoon needs to leave the platoon during vehicles to drive as a platoon.

An embodiment of this application provides a method for controlling vehicles to drive as a platoon in connection with a current vehicle platoon including a leading vehicle and following vehicles, the following vehicles including a target following vehicle about to drive away from the current vehicle platoon, the target following vehicle being a non-tail vehicle. The method includes: transmitting, from the leading vehicle, a first platoon disbanding message to the target following vehicle and a second platoon disbanding message to each of remaining following vehicles other than the target following vehicle, the second platoon disbanding message comprising a temporary disbanding instruction for instructing to temporarily disband the current vehicle platoon, wherein the target following vehicle receiving the first platoon disbanding message is configured to adjust a status thereof to a free status and drive away from the current vehicle platoon, and each of the remaining following vehicles receiving the second platoon disbanding message is configured to adjust a status thereof to a temporary disband status; transmitting, from the leading vehicle, a re-team up invitation message to each of the remaining following vehicles according to the second platoon disbanding message; receiving, at the leading vehicle, a re-team up confirmation message returned by each of the remaining following vehicles in response to the re-team up invitation message; and reorganizing each of the remaining following vehicles according to the re-team up confirmation message to form a new vehicle platoon including the leading vehicle and one or more of the remaining following vehicles that have sent the re-team up confirmation message to the leading vehicle, the new vehicle platoon not comprising the target following vehicle and remaining following vehicles that do not transmit the re-team up confirmation message to the leading vehicle.

An embodiment of this application provides a method for controlling vehicles to drive as a platoon in connection with a current vehicle platoon including a leading vehicle and following vehicles, the following vehicles including a target following vehicle about to drive away from the current vehicle platoon, the target following vehicle being a non-tail vehicle. The method includes: receiving, at the target following vehicle, a first platoon disbanding message transmitted by the leading vehicle, the leading vehicle transmitting a second platoon disbanding message to each of remaining following vehicles other than the target following vehicle, the second platoon disbanding message comprising a temporary disbanding instruction for instructing to temporarily disband the current vehicle platoon, so that each of the remaining following vehicles receiving the second platoon disbanding message adjusts a status thereof to a temporary disband status; adjusting, by the target following vehicle, a status thereof to a free status in response to the first platoon disbanding message; controlling the target following vehicle to drive away from the current vehicle platoon and stop transmitting a heartbeat message to the leading vehicle, the leading vehicle transmitting a re-team up invitation message to each of the remaining following vehicles according to the second platoon disbanding message; and receiving a re-team up confirmation message returned by each of the remaining following vehicles in response to the re-team up invitation message, the leading vehicle reorganizing each of the remaining following vehicles according to the re-team up confirmation message to form a new vehicle platoon, the new vehicle platoon not including the target following vehicle and remaining following vehicles that do not transmit the re-team up confirmation message to the leading vehicle.

An embodiment of this application provides a method for controlling vehicles to drive as a platoon in connection with a current vehicle platoon including a leading vehicle and following vehicles, the following vehicles including a target following vehicle about to drive away from the current vehicle platoon, following vehicles other than the target following vehicle being remaining following vehicles, the target following vehicle being a non-tail vehicle. The method includes: receiving at each of the remaining following vehicles, a second platoon disbanding message transmitted by the leading vehicle, the second platoon disbanding message including a temporary disbanding instruction for instructing to temporarily disband the current vehicle platoon; adjusting, by each of the remaining following vehicles, a status thereof to a temporary disband status in response to the temporary disbanding instruction in the second platoon disbanding message; receiving a re-team up invitation message transmitted by the leading vehicle in response to the second platoon disbanding message; and transmitting a re-team up confirmation message to the leading vehicle in response to the re-team up invitation message, so that the leading vehicle reorganizes each of the remaining following vehicles according to the re-team up confirmation message to form a new vehicle platoon, the new vehicle platoon not including the target following vehicle and remaining following vehicles that do not transmit the re-team up confirmation message to the leading vehicle.

An embodiment of this application provides an apparatus for controlling vehicles to drive as a platoon in connection with a current vehicle platoon including a leading vehicle and following vehicles, the following vehicles including a target following vehicle about to drive away from the current vehicle platoon, the target following vehicle being a non-tail vehicle, and the apparatus being applicable to the leading vehicle. The apparatus includes: a platoon disbanding message transmission unit, configured to transmit a first platoon disbanding message to the target following vehicle and transmit a second platoon disbanding message to each of remaining following vehicles other than the target following vehicle, the second platoon disbanding message including a temporary disbanding instruction for instructing to temporarily disband the current vehicle platoon, so that the target following vehicle receiving the first platoon disbanding message adjusts a status thereof to a free status and drives away from the current vehicle platoon, and each of the remaining following vehicles receiving the second platoon disbanding message adjusts a status thereof to a temporary disband status; a re-team up invitation message transmission unit, configured to transmit a re-team up invitation message to each of the remaining following vehicles according to the second platoon disbanding message; a re-team up confirmation message receiving unit, configured to receive a re-team up confirmation message returned by each of the remaining following vehicles in response to the re-team up invitation message; and a vehicle platoon reorganization unit, configured to reorganize each of the remaining following vehicles according to the re-team up confirmation message to form a new vehicle platoon, the new vehicle platoon not including the target following vehicle and remaining following vehicles that do not transmit the re-team up confirmation message to the leading vehicle.

An embodiment of this application provides an apparatus for controlling vehicles to drive as a platoon in connection with a current vehicle platoon including a leading vehicle and following vehicles, the following vehicles including a target following vehicle about to drive away from the current vehicle platoon, the target following vehicle being a non-tail vehicle, and the apparatus being applicable to the target following vehicle. The apparatus includes: a first platoon disbanding message receiving unit, configured to receive a first platoon disbanding message transmitted by the leading vehicle, the leading vehicle transmitting a second platoon disbanding message to each of remaining following vehicles other than the target following vehicle, the second platoon disbanding message comprising a temporary disbanding instruction for instructing to temporarily disband the current vehicle platoon, so that each of the remaining following vehicles receiving the second platoon disbanding message adjusts a status thereof to a temporary disband status; a target following vehicle status adjustment unit, configured to adjust a status of the target following vehicle to a free status in response to the first platoon disbanding message; and a target following vehicle driving away unit, configured to control the target following vehicle to drive away from the current vehicle platoon and stop transmitting a heartbeat message to the leading vehicle, the leading vehicle transmitting a re-team up invitation message to each of the remaining following vehicles according to the second platoon disbanding message; and receiving a re-team up confirmation message returned by each of the remaining following vehicles in response to the re-team up invitation message, the leading vehicle reorganizing each of the remaining following vehicles according to the re-team up confirmation message to form a new vehicle platoon, the new vehicle platoon not including the target following vehicle and remaining following vehicles that do not transmit the re-team up confirmation message to the leading vehicle.

An embodiment of this application provides an apparatus for controlling vehicles to drive as a platoon in connection with a current vehicle platoon including a leading vehicle and following vehicles, the following vehicles including a target following vehicle about to drive away from the current vehicle platoon, following vehicles other than the target following vehicle being remaining following vehicles, the target following vehicle being a non-tail vehicle, and the apparatus being applicable to each of the remaining following vehicles. The apparatus includes: a second platoon disbanding message receiving unit, configured to receive a second platoon disbanding message transmitted by the leading vehicle, the second platoon disbanding message including a temporary disbanding instruction for instructing to temporarily disband the current vehicle platoon; a remaining following vehicle status adjustment unit, configured to adjust a status of each of the remaining following vehicles to a temporary disband status in response to the temporary disbanding instruction in the second platoon disbanding message; a re-team up invitation message receiving unit, configured to receive a re-team up invitation message transmitted by the leading vehicle in response to the second platoon disbanding message; and a re-team up confirmation message transmission unit, configured to transmit a re-team up confirmation message to the leading vehicle in response to the re-team up invitation message, so that the leading vehicle reorganizes each of the remaining following vehicles according to the re-team up confirmation message to form a new vehicle platoon, the new vehicle platoon not including the target following vehicle and remaining following vehicles that do not transmit the re-team up confirmation message to the leading vehicle.

An embodiment of this application provides a non-transitory computer-readable storage medium, storing one or more computer programs, the one or more programs, when executed by a processor of an electronic device, implementing the method for controlling vehicles to drive as a platoon according to the foregoing embodiments.

An embodiment of this application provides an electronic device, including: one or more processors; a storage apparatus, configured to store one or more programs, the one or more programs, when executed by the one or more processors, causing the electronic device to implement the method for controlling vehicles to drive as a platoon according to the foregoing embodiments.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method for controlling vehicles to drive as a platoon provided in the foregoing implementations.

DESCRIPTION OF EMBODIMENTS

Some terms used in the embodiments of this application are first explained and described.

Platooning refers to at least two vehicles that follow each other closely and are connected to form a vehicle platoon having similar driving behavior based on a wireless communication technology and an automatic driving technology.

Driving as a platoon refers to at least two vehicles that drive in the form of a platoon in a specific scenario, and platooning behavior processes such as create a platoon, disband a platoon, a vehicle joins a platoon, and a vehicle leaves a platoon are further included.

Leading vehicle (LV) refers to a headmost vehicle during driving as a platoon and is responsible for management work of an entire platoon.

Following vehicle (FV) refers to another following vehicle other than the leading vehicle in the platoon during driving as a platoon.

Platooning management message (PMM) refers to a vehicle-to-vehicle or vehicle-to-infrastructure communication message that transmits information relevant to the control of platoon operations.

During actual operation of a vehicle platoon, any vehicle in the platoon may go wrong or have a requirement to leave the platoon. During platooning, an interval between vehicles is relatively small. Therefore, it is difficult for a vehicle located in middle of the platoon to leave the platoon and relatively great interference may be caused to normal driving of other vehicles in the platoon. An embodiment of this application provides a solution to a case that a non-tail vehicle inside a platoon needs to leave the platoon during vehicles driving as a platoon.

Figure 1:
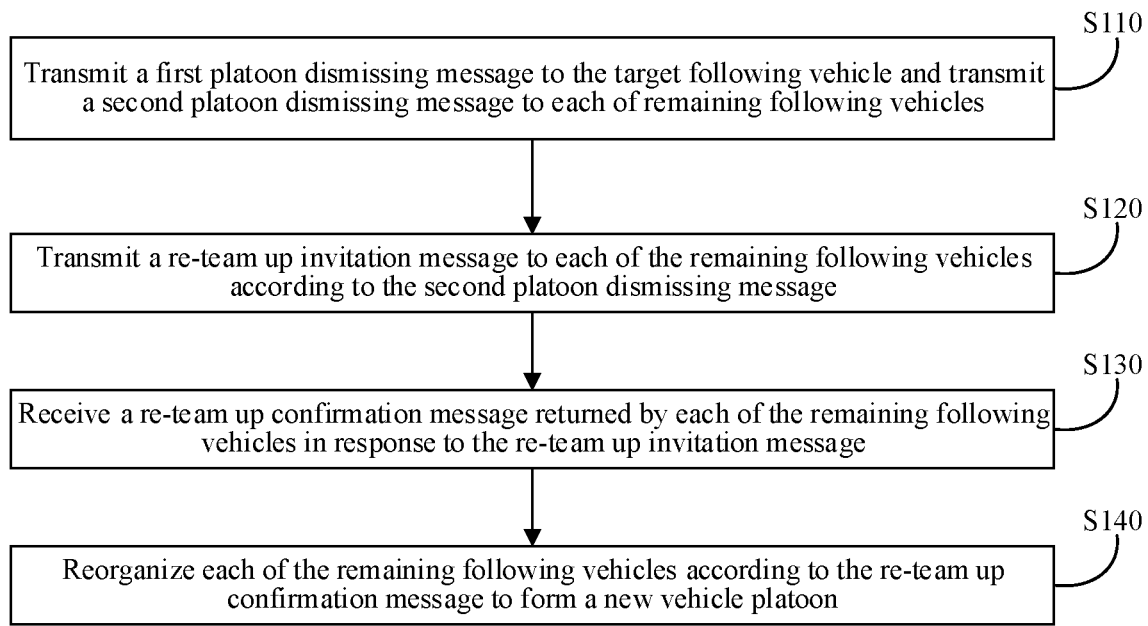
FIG. 1 is a schematic flowchart of a method for controlling vehicles to drive as a platoon according to some embodiments of this application.

FIG. 1 is a schematic flowchart of a method for controlling vehicles to drive as a platoon according to an embodiment of this application. In the embodiment of FIG. 1, a current vehicle platoon may include a leading vehicle and following vehicles, the following vehicles may include a target following vehicle about to drive away from the current vehicle platoon, and the target following vehicle is a non-tail vehicle, that is, the target following vehicle is a non-tail following vehicle that needs to leave the platoon. The method provided in the embodiment of FIG. 1 may be applicable to the leading vehicle.

In the embodiments of this application, during vehicles driving as a platoon, vehicles (for example, the leading vehicle and any following vehicle or different following vehicles) may perform communication through a wireless communication technology (the wireless communication technology may be a dedicated short range communication (DSRC) technology, cellular vehicle-to-everything (C-V2X, a communication manner based on 4G, 5G, and a further evolution cellular mobile communication technology between a networking vehicle and another "networking" road user, vehicle or infrastructure), or an electronic toll collection (ETC) system, and the wireless communication technology is not limited in this application). The leading vehicle may include a platoon control unit which is responsible for coordinating the leading vehicle and the following vehicles in the current vehicle platoon, to ensure a specific safe distance for driving as a platoon. In addition, all vehicles in the current vehicle platoon include capabilities such as sensing, positioning, planning, controlling, and interaction. The leading vehicle and the following vehicles can be connected to a cloud server through a network to implement interaction. The leading vehicle and the following vehicles report information to the cloud server, and the cloud server implements functions such as vehicle condition monitoring, scheduling, and management. However, this application is not limited thereto.

As shown in FIG. 1, the method provided in this embodiment of this application may be performed by the leading vehicle in the vehicle platoon, and includes the following steps:

Step S110: Transmit a first platoon disbanding message to the target following vehicle and transmit a second platoon disbanding message to each of remaining following vehicles other than the target following vehicle. The second platoon disbanding message includes a temporary disbanding instruction for instructing to temporarily disband the current vehicle platoon, so that the target following vehicle receiving the first platoon disbanding message adjusts a status thereof to a free status and drives away from the current vehicle platoon, and each of the remaining following vehicles receiving the second platoon disbanding message adjusts a status thereof to a temporary disband status.

In the embodiments of this application, a status in which a vehicle in the current vehicle platoon and may be set by the leading vehicle may include a "leading status", a "following status", a "free status", and a "temporary disband status". The leading vehicle is in a leading status, each of the following vehicles is in a following status, and a vehicle that is not in the vehicles driving as a platoon is in a free status (a corresponding vehicle may be referred to as a free car or a free vehicle). The temporary disband status refers to that each vehicle in the current vehicle platoon is temporarily disbanded rather than formally disbanded (the status of each vehicle in the current vehicle platoon changes to the free status after the vehicle is formally disbanded), and each vehicle may return to a re-team up status after a predetermined condition is met (for example, when determining that the target following vehicle drives away from the current vehicle platoon or a time set by a temporary disbanding timer is reached, which is not limited in this application).

In the embodiments of this application, each vehicle in the current vehicle platoon may be set by the leading vehicle to have four different roles, which are respectively a "leader", a "free vehicle", a "follower", and a "temporary free vehicle". A role of the leading vehicle is set to be a leader, a role of each of the following vehicles is set to be a follower, a role of a vehicle that has driven away from or does not join the current vehicle platoon is a free vehicle, and a temporary free vehicle refers to a role between a free vehicle and a follower of a vehicle that is temporarily disbanded rather than formally disbanded in the current vehicle platoon (a role of each vehicle in the current vehicle platoon changes to a free vehicle after the vehicle is formally disbanded) and may be re-teamed up after a predetermined condition is met.

In some embodiments, the leading vehicle may set a status of each vehicle in the current vehicle platoon and may also set a role of each vehicle in the current vehicle platoon. In some other embodiments, the leading vehicle may set the status and the role of each vehicle in the current vehicle platoon at the same time. For example, the role of the leading vehicle is a leader, and a corresponding status is a leading status. A role of each of the following vehicles is a follower, and a corresponding status is a following status. A role of a free vehicle is a free vehicle, and a corresponding status is a free status. After each of the remaining following vehicles receives the second platoon disbanding message including the temporary disbanding instruction, a corresponding role may change from a previous follower to a temporary free vehicle, and a corresponding status may change from a previous following status thereof to a temporary disband status. After the target following vehicle receives the first platoon disbanding message, a corresponding role may change from a previous follower to a free vehicle, and a corresponding status may change from a previous following status thereof to a free status.

In an exemplary embodiment, the second platoon disbanding message includes a disband status field, and a value of the disband status field represents the temporary disbanding instruction; and the first platoon disbanding message does not include the disband status field; or the first platoon disbanding message includes the disband status field, and the value of the disband status field represents a non-temporary disbanding instruction; or the first platoon disbanding message includes the disband status field, and the value of the disband status field represents the temporary disbanding instruction.

For example, the leading vehicle may transmit the first platoon disbanding message and the second platoon disbanding message to the target following vehicle and each of the remaining following vehicles respectively in a unicast manner. A packet corresponding to the second platoon disbanding message transmitted to each of the remaining following vehicles may include the disband status field, and the foregoing temporary disbanding instruction is represented by setting a value of the disband status field to a first value (for example, "1", but this application is not limited thereto). After the second platoon disbanding message is received, each of the remaining following vehicles may know that the current vehicle platoon is temporarily disbanded according to the value of the disband status field included in the second platoon disbanding message. A packet corresponding to the first platoon disbanding message transmitted to the target following vehicle may not include the disband status field, or include the disband status field but a value corresponding to the disband status field is set to a second value (for example, "2", but this application is not limited thereto) to represent a non-temporary disbanding instruction, and after the first platoon disbanding message is received, the target following vehicle may know that the target following vehicle is not temporarily disbanded and may freely drive away from the current vehicle platoon.

In another example, the leading vehicle may transmit the first platoon disbanding message and the second platoon disbanding message to the target following vehicle and each of the remaining following vehicles respectively in a broadcast manner (in this case, content of the first platoon disbanding message and content of the second platoon disbanding message are the same, and therefore may be collectively referred to as a platoon disbanding message). A packet corresponding to the platoon disbanding message transmitted to each of the remaining following vehicles and the target following vehicle may include the disband status field, and a value of the disband status field is set to a first value (for example, "1", but this application is not limited thereto) to represent the temporary disbanding instruction. After the platoon disbanding message is received, each of the remaining following vehicles may know that the current vehicle platoon is temporarily disbanded according to the value of the disband status field included in the platoon disbanding message; and the target following vehicle may also know that the current vehicle platoon is temporarily disbanded, but the target following vehicle may ignore the temporary disbanding instruction and choose to drive away from the current vehicle platoon.

In the embodiments of this application, that the leading vehicle transmits the first platoon disbanding message and the second platoon disbanding message to the target following vehicle and each of the remaining following vehicles respectively may include the following two cases: one case is that the target following vehicle applies to leave the platoon, and a trigger condition may be a platoon strategy change of the current vehicle platoon, a failure of the target following vehicle, or a driving strategy change of the target following vehicle; and the other case is that the leading vehicle actively clears the target following vehicle, and a trigger condition may be a platoon strategy change of the current vehicle platoon or that the leading vehicle finds that the target following vehicle is not suitable to continue to drive in the current vehicle platoon.

In an exemplary embodiment, before the transmitting a first platoon disbanding message to the target following vehicle and transmitting a second platoon disbanding message to each of remaining following vehicles other than the target following vehicle, the method may further include: receiving a leaving application message transmitted by the target following vehicle. The transmitting a first platoon disbanding message to the target following vehicle and transmitting a second platoon disbanding message to each of remaining following vehicles other than the target following vehicle may include: in response to the leaving application message, transmitting, by the leading vehicle, the first platoon disbanding message to the target following vehicle, and transmitting the second platoon disbanding message to each of the remaining following vehicles other than the target following vehicle.

In an exemplary embodiment, the leaving application message carries identity information of the target following vehicle. The in response to the leaving application message, transmitting, by the leading vehicle, the first platoon disbanding message to the target following vehicle, and transmitting the second platoon disbanding message to each of the remaining following vehicles other than the target following vehicle may include: obtaining platoon member information of the current vehicle platoon according to the identity information of the target following vehicle carried in the leaving application message; and determining that the target following vehicle is not a tail vehicle according to the platoon member information of the current vehicle platoon, transmitting the first platoon disbanding message to the target following vehicle, and transmitting the second platoon disbanding message to each of the remaining following vehicles. After the transmitting a first platoon disbanding message to the target following vehicle and transmitting a second platoon disbanding message to each of remaining following vehicles other than the target following vehicle, the method may further include: putting a vehicle identifier of the target following vehicle into a leaving list, to set the status of the target following vehicle to the free status; and setting, through the leading vehicle, the status of each of the remaining following vehicles to the temporary disband status.

Specifically, when a driving strategy of the target following vehicle changes, for example, when the target following vehicle needs to leave the current vehicle platoon and enters a gas station, the target following vehicle may transmit a leaving application message to the leading vehicle, and the leaving application message may include the identity information of the target following vehicle, such as any one or more of a plate number of the target following vehicle or an identity (ID) allocated to the target following vehicle in the current vehicle platoon, provided that the target following vehicle can be uniquely identified in the current vehicle platoon. After the leaving application message is received, the leading vehicle may obtain platoon member information of the entire current vehicle platoon according to the identity information of the target following vehicle carried in the leaving application message. The platoon member information of the current vehicle platoon may include related information between each vehicle and another different vehicle in the current vehicle platoon, for example, a current position of each vehicle or whether the vehicle is a nail vehicle, and if the vehicle is a non-tail (namely, in-platoon) vehicle, a position of the vehicle in the platoon may be also provided. Therefore, the leading vehicle may determine that the target following vehicle transmitting the leaving application message is not a tail vehicle, so that the leading vehicle is triggered and transmits the first platoon disbanding message and the second platoon disbanding message to the target following vehicle and each of the remaining following vehicles in the current vehicle platoon respectively, and includes a special temporary disbanding instruction in the second platoon disbanding message transmitted to each of the remaining following vehicles, where the temporary disbanding instruction indicates that the current vehicle platoon may be re-teamed up after being temporarily disbanded.

Figure 2:
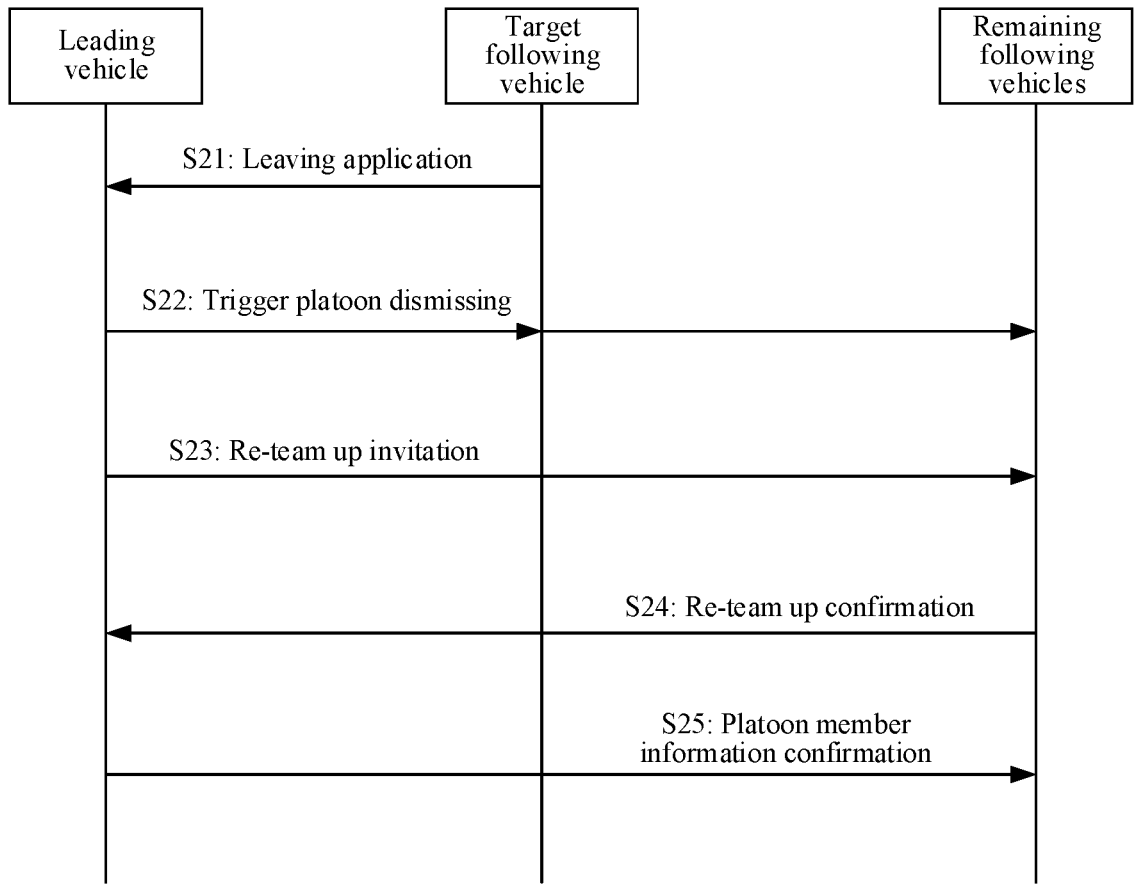
FIG. 2 is a schematic diagram of a method for controlling vehicles to drive as a platoon according to some embodiments of this application.

If the target following vehicle applies to leave the platoon, for a specific interaction process between the target following vehicle and the leading vehicle, reference may be made to FIG. 2.

In an exemplary embodiment, the transmitting a first platoon disbanding message to the target following vehicle and transmitting a second platoon disbanding message to each of remaining following vehicles other than the target following vehicle may include: when detecting abnormal behavior of the target following vehicle or in response to an adjustment instruction for adjusting the current vehicle platoon, transmitting the first platoon disbanding message to the target following vehicle and transmitting the second platoon disbanding message to each of the remaining following vehicles.

In the embodiments of this application, a trigger condition for the leading vehicle to clear the target following vehicle may be that the leading vehicle finds that the target following vehicle is abnormal (which may be a special event reported by the target following vehicle to the leading vehicle or the cloud server or may be actively discovered by the leading vehicle) or may be a platoon management requirement change of the current vehicle platoon, and an adjustment instruction is to adjust a platooning strategy of the current vehicle platoon such as clear the target following vehicle in the current vehicle platoon. The adjustment instruction may be decided and transmitted by the leading vehicle or may be received by the cloud server from the outside, which is not limited in this application. For a specific interaction process that the leading vehicle actively clears the target following vehicle, reference may be made to FIG. 4.

Step S120: Transmit a re-team up invitation message to each of the remaining following vehicles according to the second platoon disbanding message.

In the embodiments of this application, the leading vehicle transmits a re-team up invitation message to each of the remaining following vehicles in the current vehicle platoon, and the re-team up invitation message may include the platoon member information of the current vehicle platoon (in addition to the target following vehicle). It may be understood that, in terms of safety and privacy protection, or in terms of saving transmitted messages, the platoon member information transmitted by the leading vehicle to each of the remaining following vehicles may be simplified when compared with the platoon member information saved in the leading vehicle. For example, the platoon member information transmitted to each of the remaining following vehicle may include only related information about the remaining following vehicle and two adjacent remaining following vehicles in front of and behind the remaining following vehicle.

In an exemplary embodiment, the temporary disbanding instruction may include a temporary disbanding timer that specifies a time window.

After the transmitting a second platoon disbanding message to each of remaining following vehicles other than the target following vehicle, the method may further include: keeping platoon member information of each of the remaining following vehicles in the current vehicle platoon in the leading vehicle before a time specified by the temporary disbanding timer is reached. The transmitting a re-team up invitation message to each of the remaining following vehicles according to the second platoon disbanding message may include: transmitting the re-team up invitation message to each of the remaining following vehicles within the time specified by the temporary disbanding timer.

Specifically, after the leading vehicle transmits the first platoon disbanding message and the second platoon disbanding message to the target following vehicle and each of the remaining following vehicles respectively, within the time window specified by the temporary disbanding timer, the leading vehicle may not clear the platoon member information of each of the remaining following vehicles in the current vehicle platoon. In some other embodiments, the platoon member information of the target following vehicle may even be kept in the leading vehicle, and only the vehicle identifier of the target following vehicle is put into the leaving list.

In the embodiments of this application, the platoon member information may include member management information, basic information basicInfo, identity information identityInfo, path information pathInfo, and vehicle ability information vehAbilityInfo.

The member management information may further include a role and a status (for example, statuses such as applying for joining the platoon and applying for leaving the platoon may be included) of each vehicle in the current vehicle platoon, and information about adjacent vehicles in front of and behind each vehicle. The basic information, the identity information, and the vehicle ability information may further include whether each vehicle in the current vehicle platoon has a driver (whether each vehicle is automatically driven) a communication manner adopted by each vehicle, and whether privacy protection is required, and may further include information such as a brand, a model, a vehicle length, a load capacity, a color, engine power, and the number of axes of each vehicle. The path information may include information such as a destination and a driving path of each vehicle in the current vehicle platoon.

In the embodiments of this application, by keeping the platoon member information of each of the remaining following vehicles in the current vehicle platoon in the leading vehicle before the time specified by the temporary disbanding timer is reached, when each of the remaining following vehicles needs to re-team up subsequently, each of the remaining following vehicles does not need to transmit the information to the leading vehicle again and only needs to simply reply the re-team up confirmation message, and the leading vehicle also does not need to store and authenticate the information again. Therefore, a re-team up process of each of the remaining following vehicles in the temporary disband status may be greatly simplified.

In the embodiments of this application, after the time window specified by the temporary disbanding timer, if the leading vehicle does not receive a re-team up confirmation message of one remaining following vehicle, platoon member information of the remaining following vehicle in the current vehicle platoon may be still saved in the leading vehicle for a while, and it is not required to immediately clear the platoon member information of the remaining following vehicle after the time window is reached, provided that the platoon member information is still saved within the time window.

Step S130: Receive a re-team up confirmation message returned by each of the remaining following vehicles in response to the re-team up invitation message.

In an exemplary embodiment, the method may further include: putting, when the re-team up confirmation message returned by a target remaining following vehicle in the remaining following vehicles is not received within a time specified by the temporary disbanding timer, a vehicle identifier of the target remaining following vehicle into a leaving list, and setting, through the leading vehicle, a status of the target remaining following vehicle to the free status.

When the temporary disbanding instruction further includes a temporary disbanding timer, the current vehicle platoon may be temporarily disbanded within a time window specified by the temporary disbanding timer, and each of the remaining following vehicles may receive a re-team up invitation message transmitted by the leading vehicle. After the re-team up invitation message is received, if each of the remaining following vehicle intends to continuously join the platoon for driving, each of the remaining following vehicles returns a re-team up confirmation message to the leading vehicle to indicate that the remaining following vehicle agrees to continuously join the platoon for driving. When the temporary disbanding timer expires and a target remaining following vehicle does not transmit the re-team up confirmation message in response to the re-team up invitation message to the leading vehicle, the leading vehicle may consider that the target remaining following vehicle refuses to join the platoon again and the target remaining following vehicle leaves the platoon, so that the leading vehicle changes the target remaining following vehicle from the temporary disband status thereof to a free status, and a role of the target remaining following vehicle may also change from a temporary free vehicle to a free vehicle.

When the temporary disbanding timer expires and each of the remaining following vehicles does not receive the re-team up invitation message transmitted by the leading vehicle, the current vehicle platoon may be formally disbanded, that is, statuses of all vehicles change to a free status.

In an exemplary embodiment, the method may further include: receiving, by the leading vehicle, a joining application message of the target remaining following vehicle, where the joining application message carries basic information, path information, identity information, and ability information of the target remaining following vehicle; determining, by the leading vehicle, whether the target remaining following vehicle meets an entering permission condition according to the basic information, the path information, the identity information, and the ability information of the target remaining following vehicle carried in the joining application message; and transmitting, by the leading vehicle when determining that the target remaining following vehicle meets the entering permission condition, a joining instruction message to the target remaining following vehicle, so that the target remaining following vehicle joins a new vehicle platoon in response to the joining instruction message, the new vehicle platoon not including the target following vehicle and remaining following vehicles that do not transmit the re-team up confirmation message to the leading vehicle.

In the embodiments of this application, interaction processes that the target following vehicle whose role has changed to a free vehicle and the target remaining following vehicle applies for joining to the leading vehicle may be described through the following examples, and a joining process of a free vehicle is not limited in this application:

First, a privacy protection mode of the free vehicle is to be consistent with a privacy protection mode of the leading vehicle, and the joining process cannot be continued if the privacy protection modes are inconsistent.

If privacy protection in a PMM_PlatooningAnnouncement message of the leading vehicle is set to be enabled, the following steps may be included:

(1.1) The free vehicle transmits an encrypted PMM_JoiningRequest message (privacy protection privacyPro may not be filled) to the leading vehicle, and an encryption key is a public key carried in a certificate of the leading vehicle. A certificate transmitted by the free vehicle needs to carry a public key used for encryption.

(1.2) The leading vehicle determines whether the free vehicle meets an entering permission condition according to basic information basicInfo, path information pathInfo, identity information identityInfo, vehicle ability information vehAbilityInfo carried in the PMM_JoiningRequest message of the free vehicle, and performs (1.3) if yes, otherwise performs (1.4).

(1.3) The leading vehicle transmits an encrypted PMM_JoiningCommand message to the free vehicle, and an encryption key is the public key carried in the certificate transmitted by the free vehicle. A joining list joininglist stores a vehicle temporary ID in a basic safety message (BSM) of the free vehicle, a member list memberlist stores a set of IDs allocated by the leading vehicle for the leading vehicle, an adjacent front vehicle (an adjacent front remaining following vehicle of a current remaining following vehicle), and a current vehicle (the current remaining following vehicle). The set includes in-platoon serial numbers and an ID list (a value of the list ranges from 1 to n, n is a positive integer greater than 1, and a format of the list is {serial number 1, ID set 1 serial number 2, ID set 2 serial number 3, ID set 3}).

(1.4) The leading vehicle transmits a PMM_JoiningCommand message that does not need to be encrypted to the free vehicle, and a refuse response field carried in the message is set to 0 to represent that a current refuse reason is a process that the leading vehicle is processing member changes or that the entering permission condition is not met.

If the privacy protection in the PMM_PlatooningAnnouncement message of the leading vehicle is set to 0, the interaction process does not need to be encrypted, and specific content is as follows:

(2.1) The free vehicle transmits a PMM_JoiningRequest message to the leading vehicle.

(2.2) The leading vehicle determines whether the free vehicle meets an entering permission condition according to basic information basicInfo, path information pathInfo, identity information identityInfo, vehicle ability information vehAbilityInfo carried in the PMM_JoiningRequest message of the free vehicle, and performs (2.3) if yes, otherwise performs (2.4).

(2.3) The leading vehicle transmits a PMM_JoiningCommand message to the free vehicle, where a joining list joininglist stores a vehicle temporary ID in a BSM of the free vehicle, a member list memberlist stores a set of IDs of the leading vehicle, an adjacent front vehicle, and a current vehicle, and the set may include in-platoon serial numbers of allocated vehicle temporary IDs, which may remain unchanged (a format may be {serial number 1, ID1 serial number 2, ID2}).

(2.4) The leading vehicle transmits a PMM_JoiningCommand message to the free vehicle, and a refuse response field carried in the message is set to 0 to represent that a current refuse reason is a process that the leading vehicle is processing member changes or that the entering permission condition is not met.

In the foregoing steps (1.4) and (2.4), the free vehicle starts to synchronously transmit a high-frequency heartbeat message, and a temporary ID is an allocated vehicle temporary ID.

Step S140: Reorganize each of the remaining following vehicles according to the re-team up confirmation message to form a new vehicle platoon, the new vehicle platoon not including the target following vehicle and remaining following vehicles that do not transmit the re-team up confirmation message to the leading vehicle.

In an exemplary embodiment, the reorganizing each of the remaining following vehicles according to the re-team up confirmation message to form a new vehicle platoon may include: reorganizing platoon member information according to the re-team up confirmation message; and transmitting the reorganized platoon member information to each of the remaining following vehicles to form the new vehicle platoon.

Specifically, the leading vehicle reorganizes the platoon member information according to the received re-team up confirmation message returned by each of the remaining following vehicles, and transmits finally confirmed platoon member information to each of the remaining following vehicles returning the re-team up confirmation message.

According to the method for controlling vehicles to drive as a platoon provided in the implementations of this application, during a platoon driving process of a current vehicle platoon, when a target following vehicle that is a non-tail vehicle in the current vehicle platoon needs to leave the current vehicle platoon, a leading vehicle in the current vehicle platoon transmits a first platoon disbanding message and a second platoon disbanding message to the target following vehicle and each of remaining following vehicles other than the target following vehicle respectively, and the leading vehicle includes a special temporary disbanding instruction in the second platoon disbanding message transmitted to each of the remaining following vehicles, to notify each of the remaining following vehicles that the current vehicle platoon is temporarily disbanded, and after the target following vehicle leaves the platoon and changes to a free status, each of the remaining following vehicles may be reorganized to form a new vehicle platoon. In this way, each of the remaining following vehicles may respond to the temporary disbanding instruction to change a status thereof to a temporary disband status. The leading vehicle may wait until the target following vehicle drives away from the current vehicle platoon and transmit a re-team up invitation message to each of the remaining following vehicle. If each of the remaining following vehicles intends to continuously join the platoon, a re-team up confirmation message may be returned to the leading vehicle. The leading vehicle may re-team up each of the remaining following vehicles according to the received re-team up confirmation message returned by each of the remaining following vehicles to form a new vehicle platoon, and the new vehicle platoon no longer includes the target following vehicle and remaining following vehicles that do not transmit the re-team up confirmation message to the leading vehicle. That is, an embodiment of this application provides a solution to a case that a non-tail vehicle inside a platoon needs to leave the platoon during vehicles driving as a platoon. According to the solution that the target following vehicle leaves the platoon, interference to other vehicles inside the platoon can be reduced as much as possible, which is an efficient solution for controlling vehicles to drive as a platoon.

FIG. 2 is a schematic diagram of a method for controlling vehicles to drive as a platoon according to an embodiment of this application. As shown in FIG. 2, when a target following vehicle in a current vehicle platoon needs to actively leave the current vehicle platoon, a leaving process may include the following steps:

Step S21: The target following vehicle transmits a leaving application message to a leading vehicle.

Specifically, when a target following vehicle that is a non-tail vehicle needs to leave the current vehicle platoon for driving, for example, the target following vehicle goes wrong, or the target following vehicle needs to enter a service area, or the target following vehicle needs to change a driving path, the target following vehicle may transmit a leaving application message to the leading vehicle. The leaving application message may be based on a PMM message, and in the PMM message, a status is set to Askforleaving (request to leave or apply to leave), and identity information of the target following vehicle may be further included.

Step S22: The leading vehicle triggers platoon disbanding to the target following vehicle and each of remaining following vehicles respectively.

In the embodiments of this application, after the leaving application message transmitted by the target following vehicle is received, the leading vehicle triggers platoon disbanding to the target following vehicle and each of the remaining following vehicles, that is, transmits a first platoon disbanding message and a second platoon disbanding message to the target following vehicle and each of the remaining following vehicles respectively, and includes a special temporary disbanding instruction in the second platoon disbanding message transmitted to each of the remaining following vehicles. The temporary disbanding instruction may alternatively be transmitted in a manner of a platoon disbanding reason value, a name of the temporary disbanding instruction is not limited, and a main objective is to tell vehicles in the current vehicle platoon that the current vehicle platoon needs to be temporarily disbanded and re-team up may be performed later.

Specifically, the leading vehicle may add an ID of a left vehicle (an ID of the target following vehicle herein) to a leaving list leavinglist, and transmit a PMM (leadingExt: the leavinglist includes the identity information of the target following vehicle) message to the target following vehicle and each of the remaining following vehicles as the first platoon disbanding message and the second platoon disbanding message respectively. After the first platoon disbanding message is received, the target following vehicle adjusts the status thereof to a free status, sets a role to a free vehicle (Free-vehicle), drives away from the platoon, transmits a PMM (Status=leaving) message to the leading vehicle, and stops transmitting a high-frequency heartbeat message to the leading vehicle. The leading vehicle clears the leavinglist in response to the (Status=leaving) message.

Step S23: The leading vehicle transmits a re-team up invitation message to each of the remaining following vehicles.

The temporary disbanding instruction may include a temporary disbanding timer, the current vehicle platoon may be temporarily disbanded within a time window specified by the temporary disbanding timer, and the leading vehicle may transmit a re-team up invitation message to each of the remaining following vehicles in the platoon. If the temporary disbanding timer expires and the re-team up invitation message transmitted by the leading vehicle is not received, each of the remaining following vehicles considers that the current vehicle platoon may be formally disbanded, and information of the current vehicle platoon saved in each of the remaining following vehicles is cleared after the temporary disbanding timer expires.

Step S24: Each of the remaining following vehicles returns a re-team up confirmation message to the leading vehicle.

Specifically, the leading vehicle may transmit a packet including the second platoon disbanding message to each of the remaining following vehicles, and the packet includes a disband status field and a temporary disbanding timer. After the disband status field is received, all the remaining following vehicles know that they will join the platoon again later. Therefore, before the temporary disbanding timer expires, each of the remaining following vehicles may save the platoon member information of the current vehicle platoon and basically keeps an original queue, and the leading vehicle may not clear the original platoon member information of each of the remaining following vehicles in the current vehicle platoon. For example, a normal joining procedure is quite complex, the leading vehicle needs to collect information of each vehicle such as a color, an ID, a vehicle speed, and a position, and further needs to perform authentication. When each vehicle joins the platoon again, because the information is still kept, the joining procedure may be simplified. For example, the re-team up invitation message transmitted by the leading vehicle may include only basic information such as a platoon serial number, and each of the remaining following vehicles only needs to transmit the ID, the vehicle speed, and the position information (which may be included in the re-team up confirmation message) to the leading vehicle, for the leading vehicle to determine whether each of the remaining following vehicle may join the platoon again.

After the re-team up invitation message is received, if each of the remaining following vehicle intends to continuously join the platoon for driving, each of the remaining following vehicles transmits a re-team up confirmation message to the leading vehicle to indicate that the remaining following vehicle agrees to continuously join the platoon for driving. If the target remaining following vehicle does not transmit the re-team up confirmation message before T1 expires, the leading vehicle may consider that the target remaining following vehicle refuses to join the platoon again and determine that the target remaining following vehicle leave the platoon.

Figure 3:
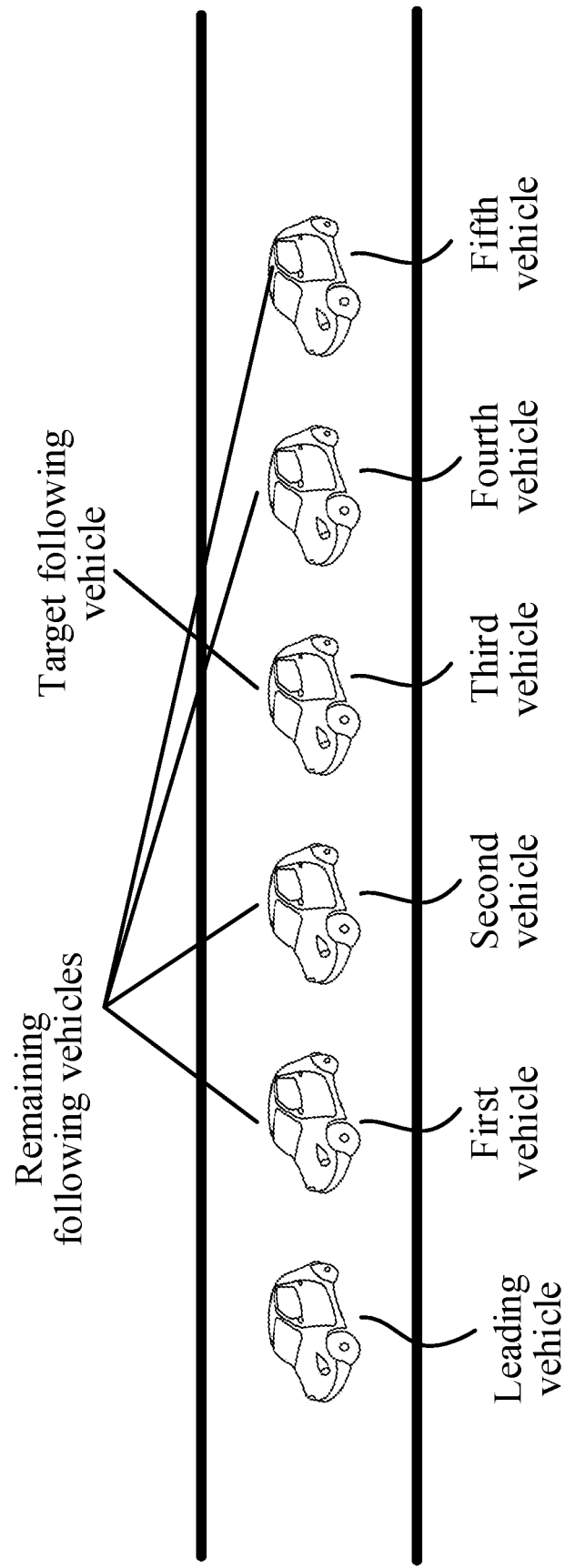
FIG. 3 is a schematic diagram of a method for controlling vehicles to drive as a platoon according to some embodiments of this application.

FIG. 3 is a schematic diagram of a method for controlling vehicle platoon driving according to an embodiment of this application. For example, as shown in FIG. 3, it is assumed that in a current vehicle platoon, in addition to a leading vehicle, 5 following vehicles of a first vehicle, a second vehicle, a third vehicle, a fourth vehicle, and a fifth vehicle are sequentially included, the first vehicle, the second vehicle, the third vehicle, and the fourth vehicle are non-tail (in-platoon) vehicles, and the fifth vehicle is a tail vehicle. It is assumed that the third vehicle is a target following vehicle, and the first vehicle, the second vehicle, the fourth vehicle, and the fifth vehicle are remaining following vehicles, the third vehicle applies to leave the platoon to the leading vehicle, and if a time window specified by a temporary disbanding timer is reached, the target following vehicle has not totally driven away from the current vehicle platoon, the first vehicle and the second vehicle may return a re-team up confirmation message to the leading vehicle to join the platoon again; and if the fourth vehicle and the fifth vehicle find that the third vehicle is still in front of them after the temporary disbanding timer expires, the fourth vehicle and the fifth vehicle may leave the platoon and transmit a normal joining application to the leading vehicle when a condition is met.

Step S25: The leading vehicle returns a platoon member information confirmation message to each of the remaining following vehicles.

Specifically, the leading vehicle removes platoon member information of a left vehicle (which is information about the target following vehicle herein), and transmits a PMM (leadingExt: the leavinglist is empty, and the memberlist does not include identity information of the left vehicle) message to each of the remaining following vehicles that returns the re-team up confirmation message as the platoon member information confirmation message.

According to the method for controlling vehicles to drive as a platoon provided in the embodiments of this application, when any target following vehicle in a current vehicle platoon needs to leave the platoon, the target following vehicle may actively transmit a leaving application message to a leading vehicle, and the leading vehicle may respond to the leaving application message and trigger the current vehicle platoon to be temporarily disbanded.

Figure 4:
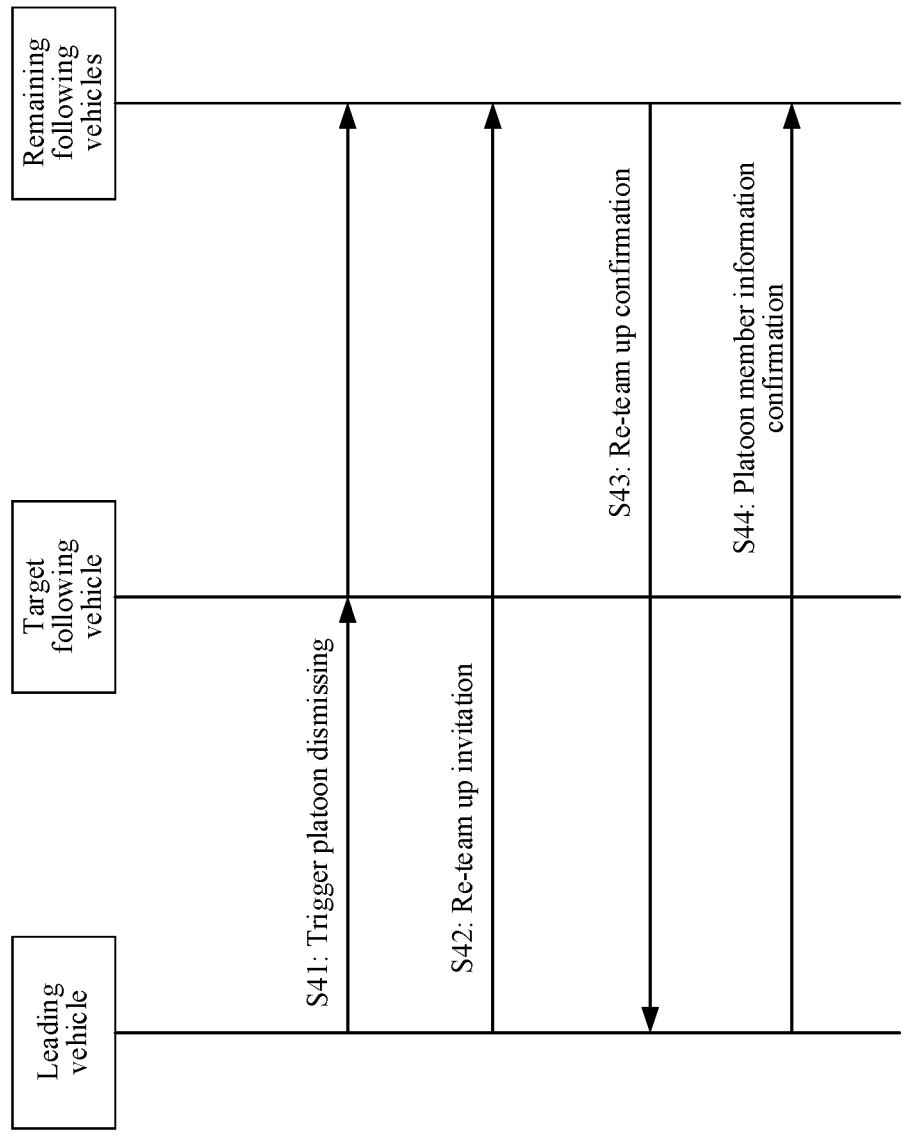
FIG. 4 is a schematic diagram of a method for controlling vehicles to drive as a platoon according to some embodiments of this application.

FIG. 4 is a schematic diagram of a method for controlling vehicles to drive as a platoon according to an embodiment of this application. As shown in FIG. 4, that a leading vehicle actively triggers a target following vehicle to leave the platoon may include the following steps:

Step S41: The leading vehicle triggers platoon disbanding to the target following vehicle and each of remaining following vehicles respectively. An ID of the target following vehicle is put into a leaving list leavinglist.

Step S42: The leading vehicle transmits a re-team up invitation message to each of the remaining following vehicles.

Step S43: Each of the remaining following vehicles returns a re-team up confirmation message to the leading vehicle.

Step S44: The leading vehicle returns a platoon member information confirmation message to each of the remaining following vehicles.

For a specific implementation process of step S41 to step S44, reference may be made to step S22 to step S25 in the embodiment of FIG. 2.

Figure 5:
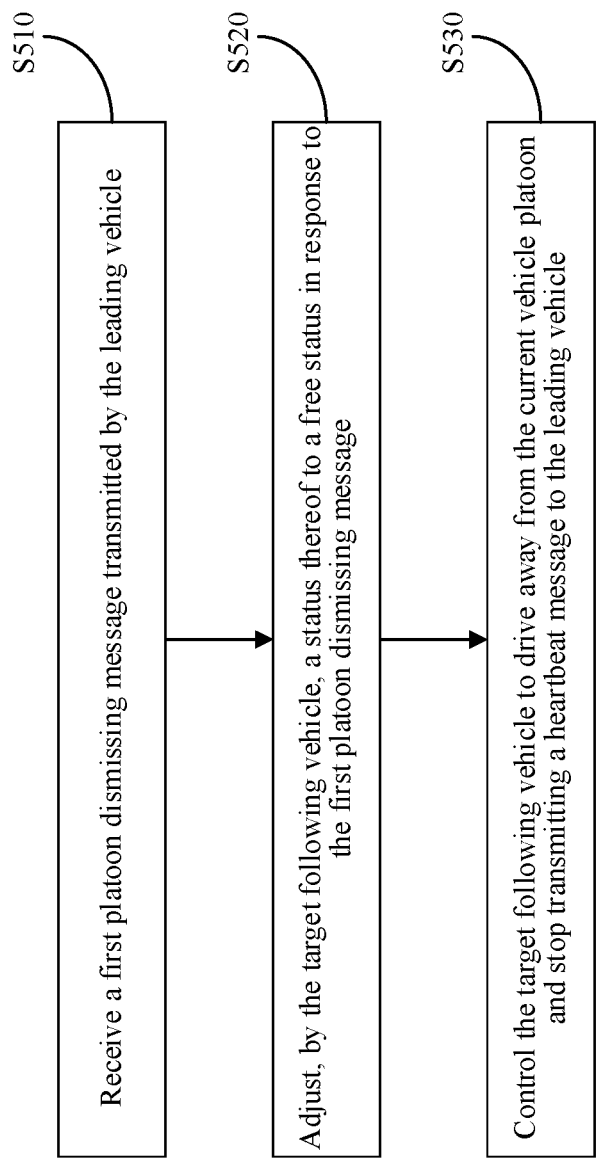
FIG. 5 is a schematic flowchart of a method for controlling vehicles to drive as a platoon according to some embodiments of this application.

According to the method for controlling vehicles to drive as a platoon provided in the embodiments of this application, the leading vehicle may also actively clear the target following vehicle in the current vehicle platoon as required to trigger the current vehicle platoon to be temporarily disbanded FIG. 5 is a schematic flowchart of a method for controlling vehicles to drive as a platoon according to an embodiment of this application. In the embodiment of FIG. 5, a current vehicle platoon may include a leading vehicle and following vehicles, the following vehicles may include a target following vehicle about to drive away from the current vehicle platoon, the target following vehicle is a non-tail vehicle, and the method described in the embodiment of FIG. 5 may be applicable to the target following vehicle.

As shown in FIG. 5, the method provided in this embodiment of this application may include the following steps:

Step S510: Receive a first platoon disbanding message transmitted by the leading vehicle.

In an exemplary embodiment, the first platoon disbanding message does not include a disband status field; or the first platoon disbanding message includes the disband status field, and a value of the disband status field represents a non-temporary disbanding instruction; or the first platoon disbanding message includes the disband status field, and the value of the disband status field represents a temporary disbanding instruction.

In an exemplary embodiment, before the receiving a first platoon disbanding message transmitted by the leading vehicle, the method may include: transmitting a leaving application message to the leading vehicle, so that the leading vehicle returns the first platoon disbanding message in response to the leaving application message.

Step S520: Adjust, by the target following vehicle, a status thereof to a free status in response to the first platoon disbanding message.

Step S530: Control the target following vehicle to drive away from the current vehicle platoon and stop transmitting a heartbeat message to the leading vehicle.

For a specific implementation of the embodiment of FIG. 5, reference may be made to content of the embodiments of FIG. 1 to FIG. 4.

Figure 6:
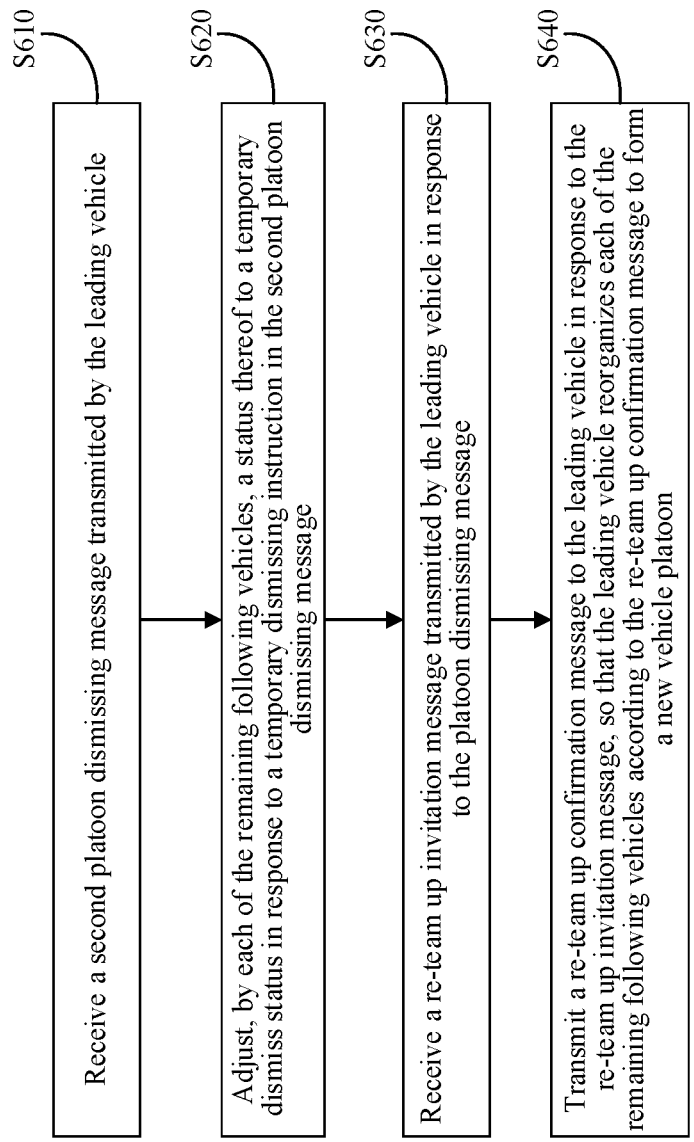
FIG. 6 is a schematic flowchart of a method for controlling vehicles to drive as a platoon according to some embodiments of this application.

FIG. 6 is a schematic flowchart of a method for controlling vehicles to drive as a platoon according to an embodiment of this application. In the embodiment of FIG. 6, a current vehicle platoon may include a leading vehicle and following vehicles, the following vehicles may include a target following vehicle about to drive away from the current vehicle platoon, following vehicles other than the target following vehicle are remaining following vehicles, the target following vehicle is a non-tail vehicle, and the method described in the embodiment of FIG. 6 may be applicable to each of the remaining following vehicles.

As shown in FIG. 6, the method provided in this embodiment of this application may include the following steps:

Step S610: Receive a second platoon disbanding message transmitted by the leading vehicle, the second platoon disbanding message including a temporary disbanding instruction for instructing to temporarily disband the current vehicle platoon.

Step S620: Adjust, by each of the remaining following vehicles, a status thereof to a temporary disband status in response to the temporary disbanding instruction in the second platoon disbanding message.

In an exemplary embodiment, the method may further include: when each of the remaining following vehicles is in the temporary disband status, continuing to save platoon member information of the current vehicle platoon in each of the remaining following vehicles.

Step S630: Receive a re-team up invitation message transmitted by the leading vehicle in response to the second platoon disbanding message.

Step S640: Transmit a re-team up confirmation message to the leading vehicle in response to the re-team up invitation message, so that the leading vehicle reorganizes each of the remaining following vehicles according to the re-team up confirmation message to form a new vehicle platoon, the new vehicle platoon not including the target following vehicle and remaining following vehicles that do not transmit the re-team up confirmation message to the leading vehicle.

In an exemplary embodiment, the temporary disbanding instruction may include a temporary disbanding timer. The transmitting a re-team up confirmation message to the leading vehicle in response to the re-team up invitation message includes: transmitting the re-team up confirmation message to the leading vehicle within a time specified by the temporary disbanding timer. The method may further include: adjusting, when each of the remaining following vehicles does not return the re-team up confirmation message to the leading vehicle within the time specified by the temporary disbanding timer, the status of each of the remaining following vehicles to a free status.

In an exemplary embodiment, the temporary disbanding instruction includes a temporary disbanding timer. The method may further include: adjusting, when each of the remaining following vehicles does not receive the re-team up invitation message transmitted by the leading vehicle within a time specified by the temporary disbanding timer, the status of each of the remaining following vehicles to a free status.

Figure 7:
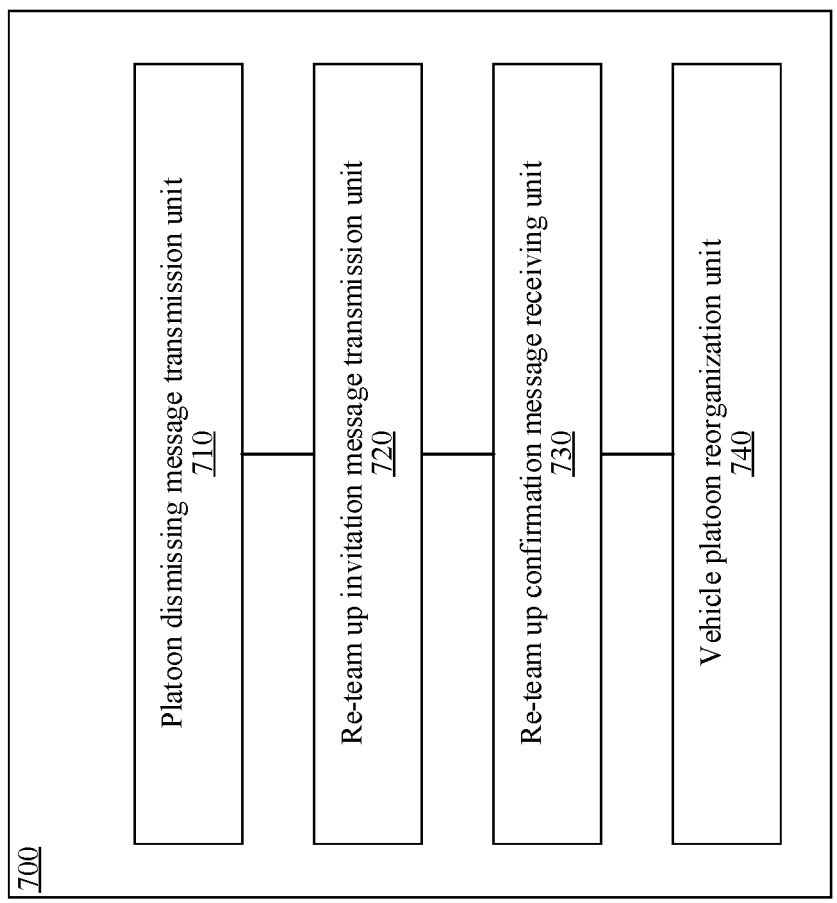
FIG. 7 is a schematic block diagram of an apparatus for controlling vehicles to drive as a platoon according to some embodiments of this application.

FIG. 7 is a schematic block diagram of an apparatus for controlling vehicles to drive as a platoon according to an embodiment of this application. In the embodiment of FIG. 7, a current vehicle platoon may include a leading vehicle and following vehicles, the following vehicles may include a target following vehicle about to drive away from the current vehicle platoon, the target following vehicle is a non-tail vehicle, and the apparatus 700 for controlling vehicles to drive as a platoon may be applicable to the leading vehicle.

The apparatus 700 for controlling vehicles to drive as a platoon provided in the embodiment of FIG. 7 may include a platoon disbanding message transmission unit 710, a re-team up invitation message transmission unit 720, a re-team up confirmation message receiving unit 730, and a vehicle platoon reorganization unit 740.

The platoon disbanding message transmission unit 710 may be configured to transmit a first platoon disbanding message to the target following vehicle and transmit a second platoon disbanding message to each of remaining following vehicles other than the target following vehicle, the second platoon disbanding message including a temporary disbanding instruction for instructing to temporarily disband the current vehicle platoon, so that the target following vehicle receiving the first platoon disbanding message adjusts a status thereof to a free status and drives away from the current vehicle platoon, and each of the remaining following vehicles receiving the second platoon disbanding message adjusts a status thereof to a temporary disband status. The re-team up invitation message transmission unit 720 may be configured to transmit a re-team up invitation message to each of the remaining following vehicles according to the second platoon disbanding message. The re-team up confirmation message receiving unit 730 may be configured to receive a re-team up confirmation message returned by each of the remaining following vehicles in response to the re-team up invitation message. The vehicle platoon reorganization unit 740 may be configured to reorganize each of the remaining following vehicles according to the re-team up confirmation message to form a new vehicle platoon, the new vehicle platoon not including the target following vehicle and remaining following vehicles that do not transmit the re-team up confirmation message to the leading vehicle.

According to the apparatus for controlling vehicles to drive as a platoon provided in the implementations of this application, during a platoon driving process of a current vehicle platoon, when a target following vehicle that is a non-tail vehicle in the current vehicle platoon needs to leave the current vehicle platoon, a leading vehicle in the current vehicle platoon transmits a first platoon disbanding message and a second platoon disbanding message to the target following vehicle and each of remaining following vehicles other than the target following vehicle respectively, and the leading vehicle includes a special temporary disbanding instruction in the second platoon disbanding message transmitted to each of the remaining following vehicles, to notify each of the remaining following vehicles that the current vehicle platoon is temporarily disbanded, and after the target following vehicle leaves the platoon and changes to a free status, each of the remaining following vehicles may be reorganized to form a new vehicle platoon. In this way, each of the remaining following vehicles may respond to the temporary disbanding instruction to change a status thereof to a temporary disband status. The leading vehicle may wait until the target following vehicle drives away from the current vehicle platoon and transmit a re-team up invitation message to each of the remaining following vehicle. If each of the remaining following vehicles intends to continuously join the platoon, a re-team up confirmation message may be returned to the leading vehicle. The leading vehicle may re-team up each of the remaining following vehicles according to the received re-team up confirmation message returned by each of the remaining following vehicles to form a new vehicle platoon, and the new vehicle platoon no longer includes the target following vehicle and remaining following vehicles that do not transmit the re-team up confirmation message to the leading vehicle. That is, an embodiment of this application provides a solution to a case that a non-tail vehicle inside a platoon needs to leave the platoon during vehicles driving as a platoon. According to the solution that the target following vehicle leaves the platoon, interference to other vehicles inside the platoon can be reduced as much as possible, which is an efficient solution for controlling vehicles to drive as a platoon.

In an exemplary embodiment, the apparatus 700 for controlling vehicles to drive as a platoon may further include: a leaving application message receiving unit, configured to receive a leaving application message transmitted by the target following vehicle before the first platoon disbanding message is transmitted to the target following vehicle and the second platoon disbanding message is transmitted to each of the remaining following vehicles other than the target following vehicle. The platoon disbanding message transmission unit 710 may include: a platoon temporary disbanding message transmission unit, configured to transmit, through the leading vehicle in response to the leaving application message, the first platoon disbanding message to the target following vehicle, and transmit the second platoon disbanding message to each of the remaining following vehicles other than the target following vehicle.

In an exemplary embodiment, the leaving application message may carry identity information of the target following vehicle. The platoon temporary disbanding message transmission unit may include: a current platoon member information obtaining unit, configured to obtain platoon member information of the current vehicle platoon according to the identity information of the target following vehicle carried in the leaving application message; and a non-tail vehicle determining unit, configured to determine that the target following vehicle is not a tail vehicle according to the platoon member information of the current vehicle platoon, transmit the first platoon disbanding message to the target following vehicle, and transmit the second platoon disbanding message to each of the remaining following vehicles. The apparatus 700 for controlling vehicles to drive as a platoon may further include: a target following vehicle free status setting unit, configured to put a vehicle identifier of the target following vehicle into a leaving list, to set the status of the target following vehicle to the free status; and a remaining following vehicle temporary disband status setting unit, configured to set, through the leading vehicle, the status of each of the remaining following vehicles to the temporary disband status.

In an exemplary embodiment, the platoon disbanding message transmission unit 710 may include: a target following vehicle active clearing unit, configured to: when detecting abnormal behavior of the target following vehicle or in response to an adjustment instruction for adjusting the current vehicle platoon, transmit the first platoon disbanding message to the target following vehicle and transmit the second platoon disbanding message to each of the remaining following vehicles.

In an exemplary embodiment, the temporary disbanding instruction may include a temporary disbanding timer. The apparatus 700 for controlling vehicles to drive as a platoon may further include: a platoon member information keeping unit, configured to keep platoon member information of each of the remaining following vehicles in the current vehicle platoon in the leading vehicle before a time specified by the temporary disbanding timer is reached; and the re-team up invitation message transmission unit 720 may include: a re-team up invitation message broadcasting unit, configured to transmit the re-team up invitation message to each of the remaining following vehicles within the time specified by the temporary disbanding timer.

In an exemplary embodiment, the temporary disbanding instruction may include a temporary disbanding timer. The apparatus 700 for controlling vehicles to drive as a platoon may further include: a remaining following vehicle status conversion unit, configured to put, when the re-team up confirmation message returned by a target remaining following vehicle in the remaining following vehicles is not received within a time specified by the temporary disbanding timer, a vehicle identifier of the target remaining following vehicle into a leaving list, and set, through the leading vehicle, a status of the target remaining following vehicle to the free status.

In an exemplary embodiment, the vehicle platoon reorganization unit 740 may include: a platoon member information organizing unit, configured to reorganize platoon member information according to the re-team up confirmation message; and a new vehicle platoon forming unit, configured to transmit the reorganized platoon member information to each of the remaining following vehicles to form a new vehicle platoon, the new vehicle platoon not including the target following vehicle and remaining following vehicles that do not transmit the re-team up confirmation message to the leading vehicle.

In an exemplary embodiment, for specific implementations of units in the apparatus for controlling vehicles to drive as a platoon provided in the embodiments of this application, reference may be made to content in the foregoing method for controlling vehicles to drive as a platoon, and details are not described herein again.

Figure 8:
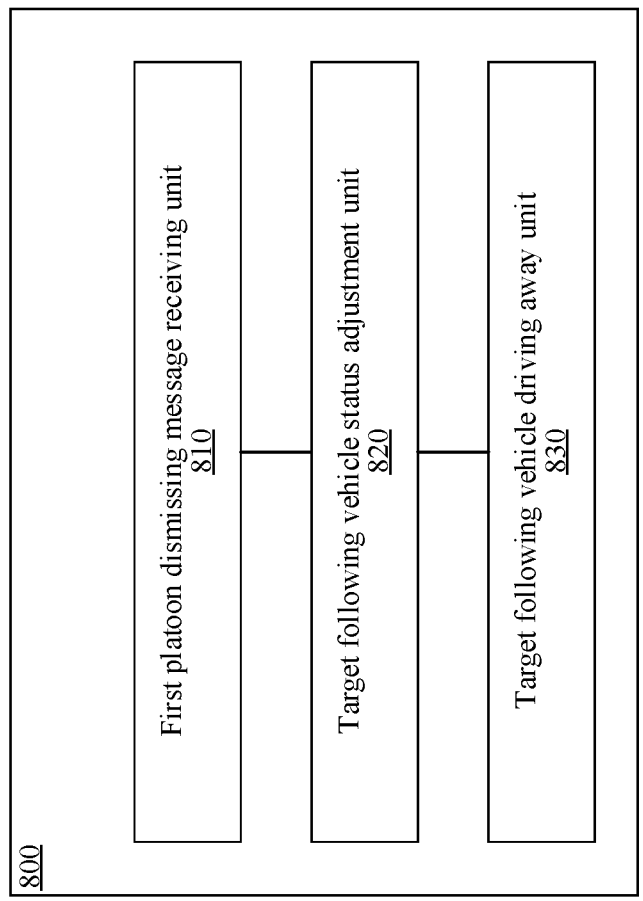
FIG. 8 is a schematic block diagram of an apparatus for controlling vehicles to drive as a platoon according to some embodiments of this application.

FIG. 8 is a schematic block diagram of an apparatus for controlling vehicles to drive as a platoon according to an embodiment of this application. In the embodiment of FIG. 8, a current vehicle platoon may include a leading vehicle and following vehicles, the following vehicles may include a target following vehicle about to drive away from the current vehicle platoon, the target following vehicle is a non-tail vehicle, and the apparatus 800 for controlling vehicles to drive as a platoon may be applicable to the target following vehicle.

As shown in FIG. 8, the apparatus 800 for controlling vehicles to drive as a platoon provided in the embodiments of this application may include a first platoon disbanding message receiving unit 810, a target following vehicle status adjustment unit 820, and a target following vehicle driving away unit 830.

In the embodiments of this application, the first platoon disbanding message receiving unit 810 may be configured to receive a first platoon disbanding message transmitted by the leading vehicle; the target following vehicle status adjustment unit 820 may be configured to adjust a status of the target following vehicle to a free status in response to the first platoon disbanding message; and the target following vehicle driving away unit 830 may be configured to control the target following vehicle to drive away from the current vehicle platoon and stop transmitting a heartbeat message to the leading vehicle.

In an exemplary embodiment, the apparatus 800 for controlling vehicles to drive as a platoon may further include: a leaving application message transmission unit, configured to: before the first platoon disbanding message transmitted by the leading vehicle is received, transmit a leaving application message to the leading vehicle, so that the leading vehicle returns the first platoon disbanding message in response to the leaving application message.

In an exemplary embodiment, for specific implementations of units in the apparatus for controlling vehicles to drive as a platoon provided in the embodiments of this application, reference may be made to content in the foregoing method for controlling vehicles to drive as a platoon, and details are not described herein again.

Figure 9:
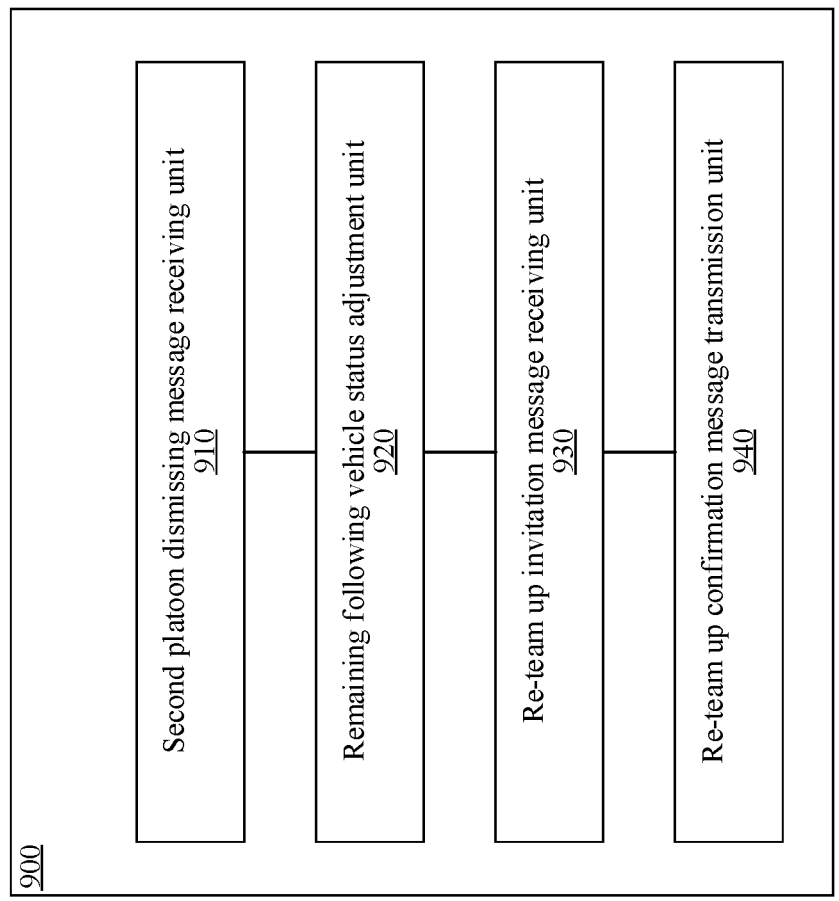
FIG. 9 is a schematic block diagram of an apparatus for controlling vehicles to drive as a platoon according to some embodiments of this application.

FIG. 9 is a schematic block diagram of an apparatus for controlling vehicles to drive as a platoon according to an embodiment of this application. In the embodiment of FIG. 9, a current vehicle platoon may include a leading vehicle and following vehicles, the following vehicles may include a target following vehicle about to drive away from the current vehicle platoon, following vehicles other than the target following vehicle are remaining following vehicles, the target following vehicle is a non-tail vehicle, and the apparatus may be applicable to each of the remaining following vehicles.

As shown in FIG. 9, the apparatus 900 for controlling vehicles to drive as a platoon provided in the embodiments of this application may include: a second platoon disbanding message receiving unit 910, a remaining following vehicle status adjustment unit 920, a re-team up invitation message receiving unit 930, and a re-team up confirmation message transmission unit 940.

In the embodiments of this application, the second platoon disbanding message receiving unit 910 may be configured to receive a second platoon disbanding message transmitted by the leading vehicle, the second platoon disbanding message including a temporary disbanding instruction for instructing to temporarily disband the current vehicle platoon; the remaining following vehicle status adjustment unit 920 may be configured to adjust a status of each of the remaining following vehicles to a temporary disband status in response to the temporary disbanding instruction in the second platoon disbanding message; the re-team up invitation message receiving unit 930 may be configured to receive a re-team up invitation message transmitted by the leading vehicle in response to the second platoon disbanding message; and the re-team up confirmation message transmission unit 940 may be configured to transmit a re-team up confirmation message to the leading vehicle in response to the re-team up invitation message, so that the leading vehicle reorganizes each of the remaining following vehicles according to the re-team up confirmation message to form a new vehicle platoon, the new vehicle platoon not including the target following vehicle and remaining following vehicles that do not transmit the re-team up confirmation message to the leading vehicle.

In an exemplary embodiment, the apparatus 900 for controlling vehicles to drive as a platoon may further include: a current platoon member information saving unit, configured to: when each of the remaining following vehicles is in the temporary disband status, continue to save platoon member information of the current vehicle platoon in each of the remaining following vehicles.

In an exemplary embodiment, the temporary disbanding instruction may include a temporary disbanding timer. The re-team up confirmation message transmission unit 940 is further configured to transmit the re-team up confirmation message to the leading vehicle within a time specified by the temporary disbanding timer; and the apparatus 900 for controlling vehicles to drive as a platoon may further include: the remaining following vehicle status adjustment unit, configured to adjust, when the re-team up confirmation message transmission unit 940 does not return the re-team up confirmation message to the leading vehicle within the time specified by the temporary disbanding timer, the status of each of the remaining following vehicles to a free status.

In an exemplary embodiment, the temporary disbanding instruction may include a temporary disbanding timer; and the apparatus 900 for controlling vehicles to drive as a platoon may further include: a remaining following vehicle free status conversion unit, configured to adjust, when each of the remaining following vehicles does not receive the re-team up invitation message transmitted by the leading vehicle within a time specified by the temporary disbanding timer, the status of each of the remaining following vehicles to a free status.

In an exemplary embodiment, for specific implementations of units in the apparatus for controlling vehicles to drive as a platoon provided in the embodiments of this application, reference may be made to content in the foregoing method for controlling vehicles to drive as a platoon, and details are not described herein again.

Figure 10:
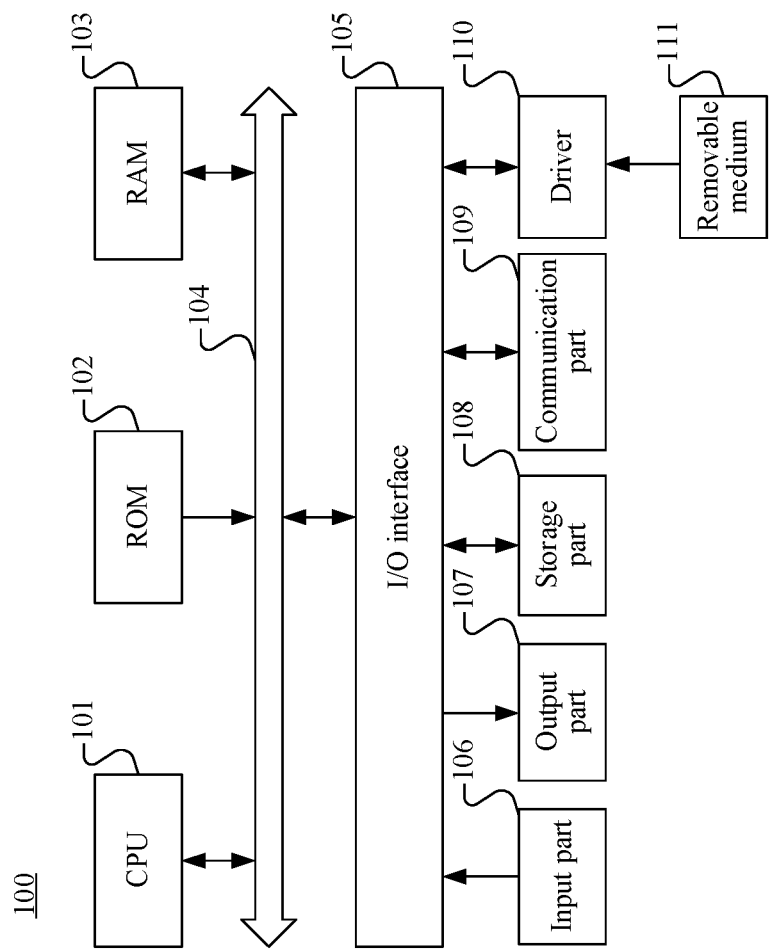
FIG. 10 is a schematic structural diagram of an electronic device adapted to implement the embodiments of this application.

FIG. 10 is a schematic structural diagram of an electronic device adapted to implement the embodiments of this application.

The electronic device 100 shown in FIG. 10 is merely an example, and is not to impose any limitation on a function and use scope of the embodiments of this application.

As shown in FIG. 10, the electronic device 100 includes a central processing unit (CPU) 101. The CPU can perform various proper actions and processing according to a program stored in a read-only memory (ROM) 102 or a program loaded from a storage part 108 into a random access memory (RAM) 103. The RAM 103 further stores various programs and data required for system operations. The CPU 101, the ROM 102, and the RAM 103 are connected to each other through a bus 104. An input/output (I/O) interface 105 is also connected to the bus 104.

The following components are connected to the I/O interface 105: an input part 106 including a keyboard and a mouse; an output part 107 including a cathode ray tube (CRT), a liquid crystal display (LCD), and a speaker; a storage part 108 including hard disk; and a communication part 109 including a network interface card such as a local area network (LAN) card or a modem. The communication part 109 performs communication processing by using a network such as the Internet. A drive 110 is also connected to the I/O interface 105 as required. A removable medium 111, such as a magnetic disk, an optical disc, a magneto-optical disk, or a semiconductor memory, is installed on the drive 110 as required, so that a computer program read from the removable medium is installed into the storage part 108 as required.

Particularly, according to an embodiment of this application, the processes described in the following by referring to the flowcharts may be implemented as computer software programs. For example, an embodiment of this application includes a computer program product, including a computer program carried on a computer-readable medium. The computer program includes program code for performing the method shown in the flowchart. In such an embodiment, by using the communication part 109, the computer program may be downloaded and installed from a network, and/or installed from the removable medium 111. When the computer program is executed by the CPU 101, the various functions defined in the method and/or apparatus of this application are executed.

The computer-readable medium shown in this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. More specific examples of the computer-readable storage medium may include, but are not limited to, an electrical connection having one or more wires, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In this application, the computer readable storage medium may be any tangible medium including or storing a program, and the program may be used by or in combination with an instruction execution system, apparatus, or device. In this application, the computer-readable signal medium may be a data signal included in a baseband or propagated as a part of a carrier, in which computer-readable program code is carried. The propagated data signal may be in a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, radio frequency (RF), or any appropriate combination thereof.

The flowcharts and block diagrams in the accompanying drawings show architectures, functions, and operations that may be implemented by using the method, the apparatus, and the computer program product according to the embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

In another aspect, this application further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement steps shown in FIG. 1, or FIG. 2, or FIG. 3, or FIG. 4, or FIG. 5.

The technical solutions of the implementations of this application may be implemented in the form of a software product. The software product may be stored in a non-volatile storage medium (which may be a CD-ROM, a USB flash drive, or a removable hard disk) or a network and includes several instructions for instructing a computer device (which may be a personal computer, a server, a touch terminal, or a network device) to execute the methods described in the implementations of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for controlling vehicles to drive as a platoon performed by an electronic device in connection with a current vehicle platoon including a leading vehicle and following vehicles, the following vehicles comprising a target following vehicle about to drive away from the current vehicle platoon, the target following vehicle being a non-tail vehicle in the current vehicle platoon, and the method comprising:

transmitting, from the leading vehicle, a first platoon disbanding message to the target following vehicle and a second platoon disbanding message to each of the remaining following vehicles other than the target following vehicle, the second platoon disbanding message comprising a temporary disbanding instruction for instructing to temporarily disband the current vehicle platoon and the temporary disbanding instruction comprising a temporary disbanding timer that specifies a time window, wherein the target following vehicle receiving the first platoon disbanding message is configured to adjust a status thereof to a free status and drive away from the current vehicle platoon, and each of the remaining following vehicles receiving the second platoon disbanding message is configured to adjust a status thereof to a temporary disband status;

transmitting, from the leading vehicle, a re-team up invitation message to each of the remaining following vehicles according to the second platoon disbanding message;

receiving, at the leading vehicle, a re-team up confirmation message returned by each of the remaining following vehicles within the time window specified by the temporary disbanding timer in response to the re-team up invitation message; and reorganizing each of the remaining following vehicles according to the re-team up confirmation message to form a new vehicle platoon including the leading vehicle and one or more of the remaining following vehicles that have sent the re-team up confirmation message to the leading vehicle, the new vehicle platoon not comprising the target following vehicle and remaining following vehicles that do not transmit the re-team up confirmation message to the leading vehicle.

2. The method according to claim 1, wherein the second platoon disbanding message comprises a disband status field, and a value of the disband status field represents the temporary disbanding instruction; and the first platoon disbanding message does not comprise the disband status field; or the first platoon disbanding message comprises the disband status field, and the value of the disband status field represents a non-temporary disbanding instruction; or the first platoon disbanding message comprises the disband status field, and the value of the disband status field represents the temporary disbanding instruction.

3. The method according to claim 1, wherein the method further comprises:

receiving a leaving application message transmitted by the target following vehicle; and transmitting the first platoon disbanding message to the target following vehicle and transmitting the second platoon disbanding message to each of the remaining following vehicles other than the target following vehicle comprises:

in response to the leaving application message, transmitting, from the leading vehicle, the first platoon disbanding message to the target following vehicle, and the second platoon disbanding message to each of the remaining following vehicles other than the target following vehicle.

4. The method according to claim 1, wherein transmitting, from the leading vehicle, the first platoon disbanding message to the target following vehicle and transmitting the second platoon disbanding message to each of the remaining following vehicles other than the target following vehicle comprises:

when detecting abnormal behavior of the target following vehicle or in response to an adjustment instruction for adjusting the current vehicle platoon, transmitting, from the leading vehicle, the first platoon disbanding message to the target following vehicle and the second platoon disbanding message to each of the remaining following vehicles.

5. The method according to claim 1, wherein after transmitting the second platoon disbanding message to each of the remaining following vehicles other than the target following vehicle, the method further comprises:

keeping platoon member information of each of the remaining following vehicles in the current vehicle platoon in the leading vehicle before the time window specified by the temporary disbanding timer is reached.

6. The method according to claim 1, wherein the method further comprises:
putting, when the re-team up confirmation message returned by a target remaining following vehicle in the remaining following vehicles is not received within the time window specified by the temporary disbanding timer, a vehicle identifier of the target remaining following vehicle into a leaving list, and setting, through the leading vehicle, a status of the target remaining following vehicle to the free status.

7. The method according to claim 1, wherein the reorganizing of each of the remaining following vehicles according to the re-team up confirmation message to form the new vehicle platoon comprises:
reorganizing platoon member information according to the re-team up confirmation message; and
transmitting, from the leading vehicle, the reorganized platoon member information to each of the remaining following vehicles to form the new vehicle platoon.

8. An electronic device in connection with a current vehicle platoon including a leading vehicle and following vehicles, the following vehicles comprising a target following vehicle about to drive away from the current vehicle platoon, the target following vehicle being a non-tail vehicle in the current vehicle platoon, the electronic device comprising:
one or more processors; and
a storage apparatus, configured to store one or more programs, the one or more programs, when executed by the one or more processors, causing the electronic device to implement a method for controlling vehicles to drive as a platoon, the method comprising:
transmitting, from the leading vehicle, a first platoon disbanding message to the target following vehicle and a second platoon disbanding message to each of the remaining following vehicles other than the target following vehicle, the second platoon disbanding message comprising a temporary disbanding instruction for instructing to temporarily disband the current vehicle platoon and the temporary disbanding instruction comprising a temporary disbanding timer that specifies a time window, wherein the target following vehicle receiving the first platoon disbanding message is configured to adjust a status thereof to a free status and drive away from the current vehicle platoon, and each of the remaining following vehicles receiving the second platoon disbanding message is configured to adjust a status thereof to a temporary disband status;
transmitting, from the leading vehicle, a re-team up invitation message to each of the remaining following vehicles according to the second platoon disbanding message;
receiving, at the leading vehicle, a re-team up confirmation message returned by each of the remaining following vehicles within the time window specified by the temporary disbanding timer in response to the re-team up invitation message; and
reorganizing each of the remaining following vehicles according to the re-team up confirmation message to form a new vehicle platoon including the leading vehicle and one or more of the remaining following vehicles that have sent the re-team up confirmation message to the leading vehicle, the new vehicle platoon not comprising the target following vehicle and remaining following vehicles that do not transmit the re-team up confirmation message to the leading vehicle.

9. The electronic device according to claim 8, wherein the second platoon disbanding message comprises a disband status field, and a value of the disband status field represents the temporary disbanding instruction; and
the first platoon disbanding message does not comprise the disband status field; or
the first platoon disbanding message comprises the disband status field, and the value of the disband status field represents a non-temporary disbanding instruction; or
the first platoon disbanding message comprises the disband status field, and the value of the disband status field represents the temporary disbanding instruction.

10. The electronic device according to claim 8, wherein the method further comprises:
receiving a leaving application message transmitted by the target following vehicle; and
transmitting the first platoon disbanding message to the target following vehicle and transmitting the second platoon disbanding message to each of the remaining following vehicles other than the target following vehicle comprises:
in response to the leaving application message, transmitting, from the leading vehicle, the first platoon disbanding message to the target following vehicle, and the second platoon disbanding message to each of the remaining following vehicles other than the target following vehicle.

11. The electronic device according to claim 8, wherein transmitting, from the leading vehicle, the first platoon disbanding message to the target following vehicle and transmitting the second platoon disbanding message to each of the remaining following vehicles other than the target following vehicle comprises:
when detecting abnormal behavior of the target following vehicle or in response to an adjustment instruction for adjusting the current vehicle platoon, transmitting, from the leading vehicle, the first platoon disbanding message to the target following vehicle and the second platoon disbanding message to each of the remaining following vehicles.

12. The electronic device according to claim 8, wherein after transmitting the second platoon disbanding message to each of the remaining following vehicles other than the target following vehicle, the method further comprises:
keeping platoon member information of each of the remaining following vehicles in the current vehicle platoon in the leading vehicle before the time window specified by the temporary disbanding timer is reached.

13. The electronic device according to claim 8, wherein the method further comprises:
putting, when the re-team up confirmation message returned by a target remaining following vehicle in the remaining following vehicles is not received within the time window specified by the temporary disbanding timer, a vehicle identifier of the target remaining following vehicle into a leaving list, and setting, through the leading vehicle, a status of the target remaining following vehicle to the free status.

14. The electronic device according to claim 8, wherein the reorganizing of each of the remaining following vehicles according to the re-team up confirmation message to form the new vehicle platoon comprises:
reorganizing platoon member information according to the re-team up confirmation message; and transmitting, from the leading vehicle, the reorganized platoon member information to each of the remaining following vehicles to form the new vehicle platoon.

15. A non-transitory computer-readable storage medium, storing one or more computer programs, the one or more programs, when executed by one or more processors of an electronic device in connection with a current vehicle platoon including a leading vehicle and following vehicles, the following vehicles comprising a target following vehicle about to drive away from the current vehicle platoon, the target following vehicle being a non-tail vehicle in the current vehicle platoon, causing the electronic device to implement a method for controlling vehicles to drive as a platoon, the method comprising:

transmitting, from the leading vehicle, a first platoon disbanding message to the target following vehicle and a second platoon disbanding message to each of the remaining following vehicles other than the target following vehicle, the second platoon disbanding message comprising a temporary disbanding instruction for instructing to temporarily disband the current vehicle platoon and the temporary disbanding instruction comprising a temporary disbanding timer that specifies a time window, wherein the target following vehicle receiving the first platoon disbanding message is configured to adjust a status thereof to a free status and drive away from the current vehicle platoon, and each of the remaining following vehicles receiving the second platoon disbanding message is configured to adjust a status thereof to a temporary disband status;

transmitting, from the leading vehicle, a re-team up invitation message to each of the remaining following vehicles according to the second platoon disbanding message;

receiving, at the leading vehicle, a re-team up confirmation message returned by each of the remaining following vehicles within the time window specified by the temporary disbanding timer in response to the re-team up invitation message; and reorganizing each of the remaining following vehicles according to the re-team up confirmation message to form a new vehicle platoon including the leading vehicle and one or more of the remaining following vehicles that have sent the re-team up confirmation message to the leading vehicle, the new vehicle platoon not comprising the target following vehicle and remaining following vehicles that do not transmit the re-team up confirmation message to the leading vehicle.

16. The non-transitory computer-readable storage medium according to claim 15, wherein the second platoon disbanding message comprises a disband status field, and a value of the disband status field represents the temporary disbanding instruction; and the first platoon disbanding message does not comprise the disband status field; or the first platoon disbanding message comprises the disband status field, and the value of the disband status field represents a non-temporary disbanding instruction; or the first platoon disbanding message comprises the disband status field, and the value of the disband status field represents the temporary disbanding instruction.

17. The non-transitory computer-readable storage medium according to claim 15, wherein the method further comprises:

receiving a leaving application message transmitted by the target following vehicle; and transmitting the first platoon disbanding message to the target following vehicle and transmitting the second platoon disbanding message to each of the remaining following vehicles other than the target following vehicle comprises:

in response to the leaving application message, transmitting, from the leading vehicle, the first platoon disbanding message to the target following vehicle, and the second platoon disbanding message to each of the remaining following vehicles other than the target following vehicle.

18. The non-transitory computer-readable storage medium according to claim 15, wherein transmitting, from the leading vehicle, the first platoon disbanding message to the target following vehicle and transmitting the second platoon disbanding message to each of the remaining following vehicles other than the target following vehicle comprises:

when detecting abnormal behavior of the target following vehicle or in response to an adjustment instruction for adjusting the current vehicle platoon, transmitting, from the leading vehicle, the first platoon disbanding message to the target following vehicle and the second platoon disbanding message to each of the remaining following vehicles.

19. The non-transitory computer-readable storage medium according to claim 15, wherein after transmitting the second platoon disbanding message to each of the remaining following vehicles other than the target following vehicle, the method further comprises:

keeping platoon member information of each of the remaining following vehicles in the current vehicle platoon in the leading vehicle before the time window specified by the temporary disbanding timer is reached.

20. The non-transitory computer-readable storage medium according to claim 15, wherein the method further comprises:

putting, when the re-team up confirmation message returned by a target remaining following vehicle in the remaining following vehicles is not received within the time window specified by the temporary disbanding timer, a vehicle identifier of the target remaining following vehicle into a leaving list, and setting, through the leading vehicle, a status of the target remaining following vehicle to the free status.

* * * * *